May 13, 1969 E. H. PAGLEE 3,444,385

LIGHT GUIDE MOVABLE ON CONVEYOR FOR CODING

Filed April 28, 1966 Sheet 1 of 2

INVENTOR
Edgar H. Paglee

BY Littlepage & Quaintance
ATTORNEYS

INVENTOR
Edgar H. Paglee

BY Littlepage & Quaintance

ATTORNEYS

United States Patent Office 3,444,385
Patented May 13, 1969

3,444,385

LIGHT GUIDE MOVABLE ON CONVEYOR FOR CODING

Edgar H. Paglee, Bethesda, Md., assignor, by mesne assignments, to Automated Handling Systems Inc., Washington, D.C., a corporation of the District of Columbia Filed Apr. 28, 1966, Ser. No. 546,004
Int. Cl. H01j *5/16, 39/12;* G02b *5/14*
U.S. Cl. 250—227 10 Claims

ABSTRACT OF THE DISCLOSURE

Optical coding apparatus for materials handling conveyors having light sources and sensors mounted along tracks and having repositionable light transmitting bodies mounted on moving articles on the conveyor for selectively completing an optical circuit to indicate presence near a light source and sensor of certain articles are described herein.

This invention concerns light coding apparatus. Described herein are moveable rods and plates with coded tabs and pushbuttons for use with common focused light sources and photoelectric cells. This invention has particular application to the conveyor art where requirements exist for accurate designation of instructions for operations as a carrier passes a station.

The problem solved by the present invention is one which has recently become important in the growing materials handling art. As sophisticated equipment becomes capable of performing more functions with no direct human supervision, the need arises to code materials so that they may be successively treated according to predetermined plans.

Using light sources and photoelectric cells, retroflective tapes have been attached to cartons and carriers for keying signal circuits as the cartons or carriers pass fixed light sources and reflection sensors. These devices have inherent disadvantages which this invention overcomes. Carriers, which are expensive, are disfigured by repeated applications of tapes, and direct application of reflective tapes on carriers and carton requires time consuming precision.

The present invention facilitates resetting of the indices while carriers are underway. Recoding can be performed as carriers or trolleys are loaded, or the coders easily may be reset at any desired point in their travel. Peeling off old reflective tape and applying new patches of tape in old optical coding systems required time and precision work upon each resetting, but those repetitive efforts are rendered unnecessary by the present invention.

A few optical coding devices have used permanent adjustable mountings for reflective patches. However, at least two drawbacks are present in those devices. First, a complete light source and receiver must be used with each patch; in the present system one light source may illuminate several indicia. In known devices, the use of multiple reflective patches coded according to position usually necessitates the use of an additional non-coded reference reflector with associated light source and photocell. Since light receiving and light projective ends are separated in the coder disclosed herein, no additional references are required. Retro-reflective patches used in known devices require coincident light beams, which in turn require relatively complex structure to project and to receive light along the same path. The present invention which passes light over spaced courses, operates with simplified, less expensive source and sensing apparatus.

One objective of this invention is the provision of light transmitting coding apparatus.

Another objective of the invention is the provision of light transmitting coding apparatus for use with conveyor systems.

Providing special forms of light transmitting apparatus and coding devices is a further objective of this invention.

These and further objectives will be apparent from the specification and from the drawing in which.

Figures 1, 2:
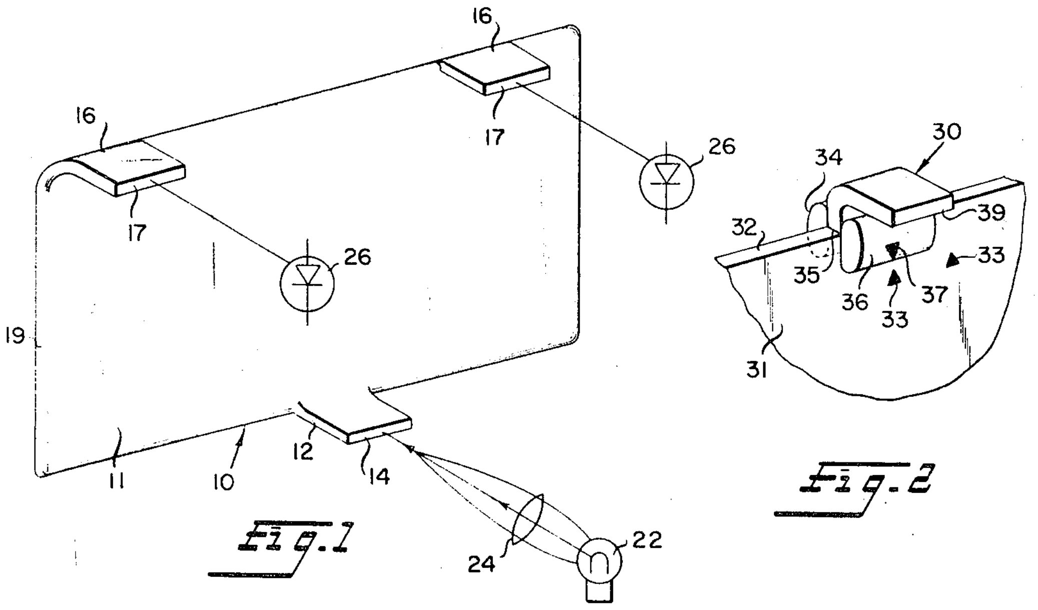
FIGURE 1 is a perspective view of a light transmitting panel having a light receiving tab and positionally coded light emitting tabs.
FIGURE 2 is a detail of a modification of the panel shown in FIGURE 1 in which light emitting or light receiving tabs may be adjustable on a panel.

Referring to FIGURE 1, a light conducting body or panel is generally indicated by the numeral 10. Main body 11 of the panel is surrounded by rounded edges 19. Tab 12 projects normally from body 11 and terminates in light receiving surface 14. Tabs 16 are fixed on the upper edge of body 10. The upper tabs extend at right angles from panel 10 and terminate in light emitting faces 17.

When panel 10 is mounted as shown on a horizontally moving object, as tab 12 approaches light source 22, light focused by lens 24 passes through surface 14. At the same time, light emitted through surfaces 17 is picked up by photocells 26. If photocells are spaced apart similar to tabs 16, both cells are illuminated, and code responsive apparatus is keyed. If the photocells are not similarly keyed, no response is keyed.

FIGURE 2 is an alternate embodiment of the panel shown in FIGURE 1 in which a light emitting or receiving tab 30 is slidably mounted on edge 32 of light conducting panel 31. Tab 30 is supported by lugs 34 and 36, which overlie opposite faces of panel 31. Face 35 intermediate lugs 34 and 36 fits in complementary close fitting arrangement with flat edge 32. Opposing points 33 and 37 provide proper positioning so that light emitting surface 39 may be aligned with a desired photocell. Sliding tab 30 may be combined with fixed tabs as shown in FIGURE 1 or with other sliding tabs.

Figure 3:
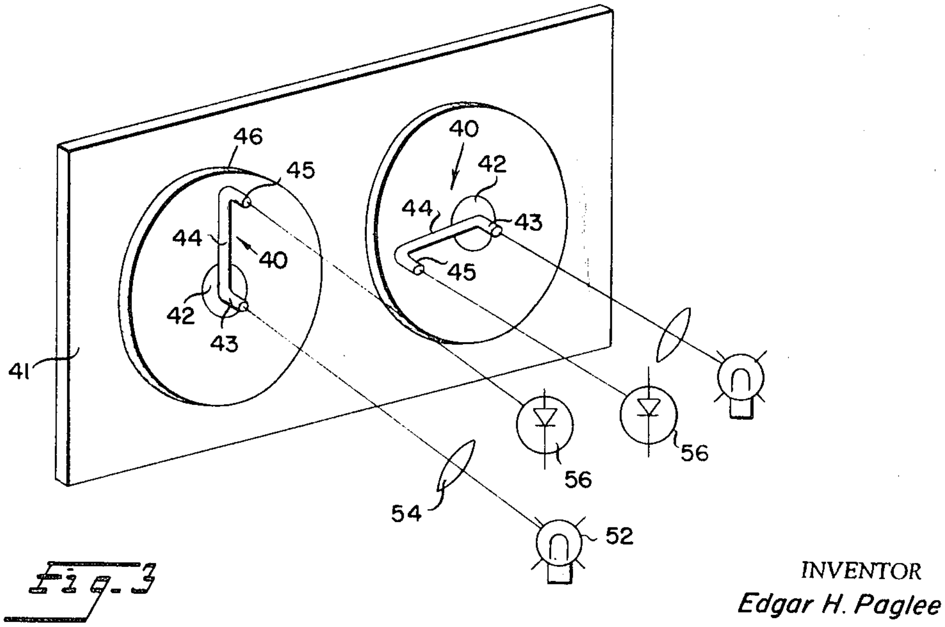
FIGURE 3 is a third embodiment of the invention, in which light receiving ends of light transmitting rods pivot in place, while emitting ends are arcuately moved into coded positions.

In FIGURE 3 light conducting rods are rotatable about pivots 42 which are mounted on board 41. Light receiving ends 43 remain stationary while intermediate shanks 44 and light emitting ends rotate to coded positions. Lights 52, lenses 54 and photocells 56 are fixed at a station along a conveyor. As board 41 passes the station, if rods 40 are arranged in complementary positions to the lamps and photocells at a station, simultaneous excitation of photocells 56 keys a response circuit. Alternatively the rods may be slid across the surface of plate 41 to new positions. The rod may be translatable or otherwise moveable, and they may be constructed of rectangular or polygonal strips. Opposite ends may be turned at any angles.

Figure 4:
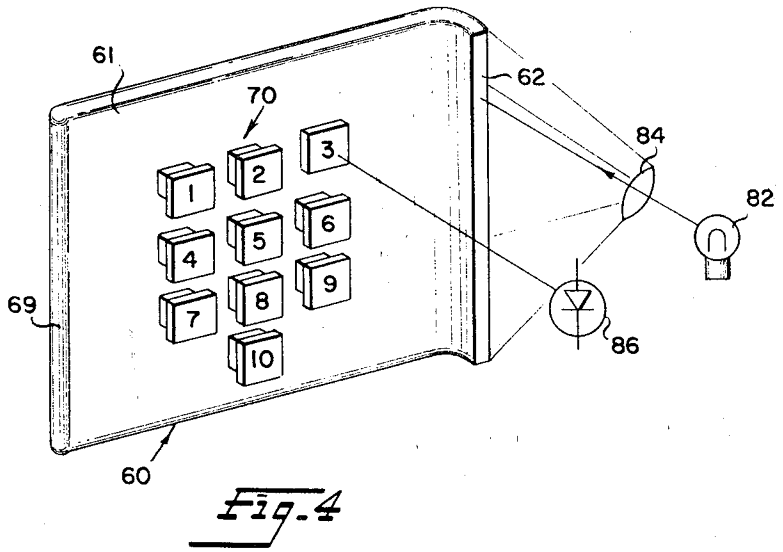
FIGURE 4 illustrates a light conducting panel having a light receiving edge and selectively light emitting push buttons.
Figure 4A:
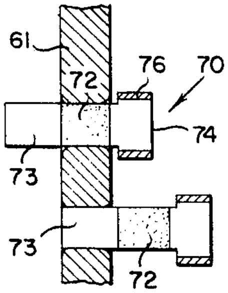
FIGURE 4A is a section detail of the panel taken along line *4a—4a* of FIGURE 4.

Coder 60 has reciprocable push buttons 70 mounted in translucent plate 61, which is bounded by a light receiving edge 62 and rounded edges 69. As shown in FIGURES 4 and 4A, push buttons 70 have a frosted area 72 to receive light from apertures in plate 61. Areas 73 prevent light transmission from plate 61 to the push buttons. Light is projected out of button faces 74, while the opaque areas. 73 and 76, prevent radiation toward photocells 86 from apertures in plate 61.

Lens 84 projects light along the entire light receiving edge 62 of plate 61. If depressed buttons align with photocells as edge 62 passes fixed light source 82 and lens 84, a response circuit will be keyed.

Although this invention has been described by specific embodiments, other modifications and embodiments are apparent herefrom. A light conducting body may be mounted on a station while source and photocell pass on a moving conveyor. The body may be fixed and relative positions of sensors and source may be changed. Several other variations may be made. Therefore, the scope of the invention is defined only in the appended claims.

I claim:

1. In conveyor means associated with station means for passing materials in relative motion with respect to said station means and associated with apparatus for moving the conveyor means with respect to the station means and apparatus for sensing positioning of selected articles with respect to said station means in response to preselected coded radiant energy signals being transmitted between the conveyor means and the station means by coding apparatus located at complementary positions on said conveyor means and said station means, the improved radiant energy apparatus comprising:

at least one radiant energy transmitting body element mounted on said conveyor means, said body element having at least one portion mounted for movement with respect to the conveyor means into selected coded positions;

at least one radiant energy source element mounted on said station means in radiant energy transmitting association with said body element for transmitting radiant energy thereto during at least one selected point in relative motion of said conveyor means and said station means;

at least one radiant energy sensitive element mounted on said station means in radiant energy transmitting association with said body in one selected coded position for receiving radiant energy therefrom during said at least one selected point in relative motion of said conveyor means and said station means.

2. Apparatus of claim 1 wherein the radiant energy source element is a light source, wherein the radiant energy sensitive element is a light sensitive element, and wherein said body element comprises at least one light conducting rod mounted for movable positioning on said conveyor means.

3. Apparatus of claim 2 wherein said at least one light conducting rod comprises a middle elongated shank and two opposite end portions bent angularly to said shank and outwardly terminating in light receiving and transmitting faces.

4. Apparatus of claim 3 wherein said at least one rod is pivoted on said conveyor means for selective rotation about an axis normal to said shank.

5. Apparatus of claim 4 wherein said at least one rod is pivoted into predetermined positions about an axis coincident with an axis of one of said end portions.

6. Apparatus of claim 1 wherein the radiant energy source element is a light source, wherein the radiant energy sensitive element is a light sensitive element, and wherein the at least one radiant energy transmitting body element comprises a light transmitting body having light receiving and light transmitting projections extending therefrom, and means to selectively position at least one of said projections with respect to another of the said projections.

7. Apparatus of claim 6 wherein said body comprises a light conducting rod having a central shank and opposite end portions bent angularly to said shank, said end portions defining light receiving and transmitting faces remote from said shank, and means to selectively pivot said shank about an axis of one of said end portions.

8. Apparatus of claim 6 wherein said light transmitting body comprises a light conducting plate and wherein said projections comprise light transmitting and receiving tabs mounted in continuation of edges of said plate.

9. Apparatus of claim 8 wherein said plate comprises opposite faces and at least one light transmitting edge intermediate said faces and wherein at least one of said tabs defines spaced lugs extending partially over said opposite faces and defines a light transmitting area intermediate said lugs, said at least one tab being slidable over a light transmitting edge of said plate.

10. Apparatus of claim 6 wherein said body comprises a plate having a light receiving surface and wherein said projections comprise a plurality of light transmitting devices transversely reciprocable in apertures in said plate, said devices having light emitting surfaces parallel to a face of the plate and having limited light receiving surfaces selectively engageable with internal surfaces of said apertures.

References Cited

UNITED STATES PATENTS

| | | | |
|---|---|---|---|
| 2,640,144 | 5/1953 | Levy | 350—96 X |
| 3,125,013 | 3/1964 | Herrick et al. | 350—96 X |
| 3,131,670 | 5/1964 | Hardesty | 350—96 X |
| 3,192,391 | 6/1965 | Ressler | 350—96 X |
| 3,254,557 | 6/1966 | Brake et al. | 250—227 X |
| 3,328,589 | 6/1967 | Ferguson | 250—227 X |
| 3,349,592 | 10/1967 | Smith | 350—96 X |
| 3,349,906 | 10/1967 | Calhoun et al. | 250—227 X |
| 3,372,240 | 3/1968 | Boyers et al. | 250—227 X |
| 3,375,377 | 3/1968 | Barrows | 250—227 X |

ROBERT SEGAL, *Primary Examiner.*

U.S. Cl. X.R.

350—96